L. B. LEADBEATER.
RAIL JOINT.
APPLICATION FILED OCT. 15, 1914.
1,163,673. Patented Dec. 14, 1915.
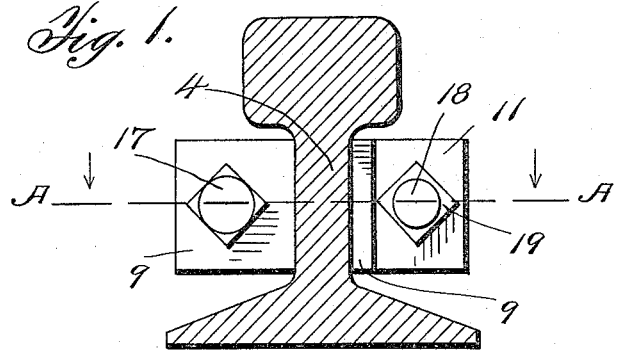
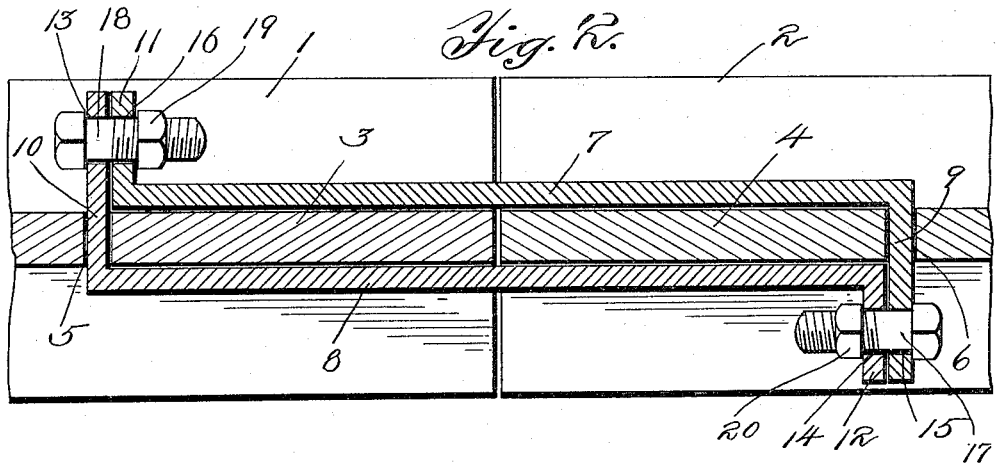
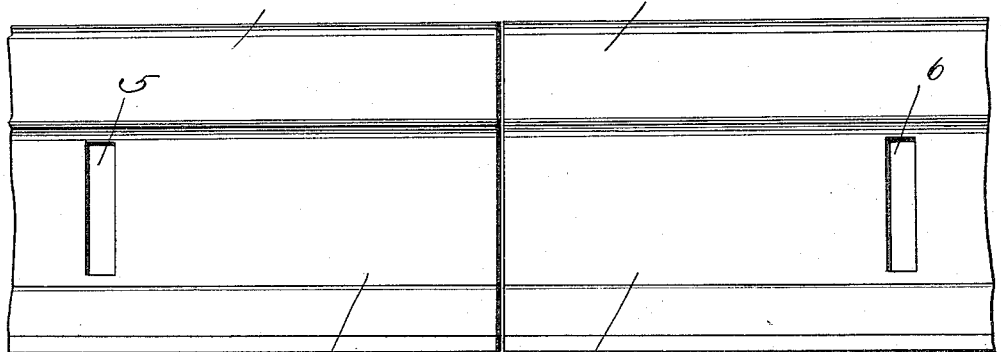
Witnesses
M. P. McKee
G. C. Tracy
Inventor
L. B. Leadbeater
By Alex. J. Wedderburn, Jr.
Attorney

UNITED STATES PATENT OFFICE.

LUKE B. LEADBEATER, OF SOUTH BROWNSVILLE, PENNSYLVANIA.

RAIL-JOINT.

1,163,673.

Specification of Letters Patent. Patented Dec. 14, 1915.

Application filed October 15, 1914. Serial No. 866,878.

*To all whom it may concern:*

Be it known that I, LUKE B. LEADBEATER, a citizen of the United States, residing at South Brownsville, in the county of Fayette and State of Pennsylvania, have invented certain new and useful Improvements in Rail-Joints, of which the following is a specification.

This invention relates to improvements in rail joints and has for its object to provide means for rigidly connecting the abutting ends of a pair of rail members.

Another object of the invention is to provide means for rigidly connecting rail ends whereby a minimum number of bolts are required.

Still another object of the invention is to provide a pair of fish plates adjoining the rail ends, said plates being so constructed that the opposing ends of the two plates may be fixedly connected together.

With the above and other objects in view which will be more fully explained in the following specification, I have invented the device illustrated in the accompanying drawings in which—

Figure 1, is a transverse sectional view of a railway showing an end elevational view of my invention thereon. Fig. 2, is a section taken on line A—A of Fig. 1. Fig. 3, is a fragmental elevational view of the opposing ends of a pair of rails.

Like reference characters indicate like parts throughout the specification and in the several views in the drawings in which 1 and 2, indicate the abutting ends of a pair of rails, the webs 3 and 4, having openings 5 and 6, spaced away from the ends of said rails.

7 and 8, are similarly formed fish plates each having long right angular ends 9 and 10, each having a short right angular end 11 and 12, the ends 9 and 10, being adapted to extend through the openings 5 and 6, in the webs 3 and 4. The ends 9 and 10, are provided with openings 13 and 15, which aline with the openings 14 and 16, in the ends 11 and 12, to receive the bolts 17 and 18, whereby said ends 9 and 12, 10 and 11, are held rigidly fixed together, by means of the nuts 19 and 20, on said bolts 17 and 18. It will be readily seen from the above description of my invention that the fish plates 7 and 8, will hold the rails rigidly connected with only two bolts being required for this purpose.

Having now described my invention, that which I claim to be new and desire to procure by Letters Patent is:—

1. A pair of fish plates each having its ends oppositely turned and means for connecting the ends of one plate to the ends of the other plate.

2. In combination with rails having openings in their abutting ends, a pair of fish plates having right angular ends together, one end of each of said plates being adapted to extend through said openings.

3. In combination with rails having openings in their abutting ends, a pair of fish plates having right angular ends, one end of each of said plates being adapted to extend through said openings, and contact with an end of the other of said plates.

4. In combination with rails having openings in their abutting ends, a pair of fish plates having right angular ends, one end of each of said plates being adapted to extend through said openings, and contact with an end of the other of said plates, and means for connecting said ends.

5. In combination with rails having openings in their abutting ends, a pair of fish plates having right angular ends, one end of each of said plates being adapted to extend through said openings, and contact with an end of the other of said plates, means for connecting said ends, said means consisting of bolts.

6. In combination with rails having openings in their abutting ends, a pair of fish plates having right angular ends, one end of each of said plates, being adapted to extend through said openings, and contact with the end of the other said plates, means for connecting said ends, said means consisting of bolts, one of said ends being longer than the other of said ends, whereby the edges of said ends will be flushed when in position.

7. In combination with rails having openings in their abutting ends, a pair of fish plates having right angular ends, one end of each of said plates being adapted to extend through said openings and contact with the end of the other said plates, means for connecting said ends, said means consisting of bolts, one of said ends being longer than the other of said ends, whereby the edges of said ends will be flushed when in position, each of said ends having openings therein adapted to aline with the opening in said abutting end to receive said bolts.

8. A pair of fish plates each having one end projecting through a rail and means for securing the other ends to said projecting ends.

9. A pair of fish plates each having oppositely turned ends, one end of each plate projecting through a rail and abutting one end of the other plate and means for securing said abutting ends.

10. A pair of fish plates each having right angular ends and means for connecting said ends, said ends being turned in opposing directions, the ends of each plate having openings alining with the openings in said other plate to receive said means.

11. A pair of fish plates each having right angular ends and means for connecting said ends, said ends being turned in opposing directions, the ends of each plate having openings alining with the openings in said other plate to receive said means, in combination with rail ends each having openings through which one of said ends project.

12. In combination with rails having openings in abutting ends, a pair of plates with oppositely disposed right angular ends and means for connecting the ends of one plate with the ends of the other plate.

13. In combination with rails having openings in abutting ends, a pair of plates with oppositely disposed right angular ends and means for connecting the ends of one plate with the ends of the other plate, the adjacent ends of said plates having alining openings to receive said connecting means.

14. In combination with rails having openings in abutting ends, a pair of plates with oppositely disposed right angular ends and means for connecting the ends of one plate with the ends of the other plate, the adjacent ends of said plates having alining openings to receive said connecting means, one end of each plate adapted to project through one of said rail openings to engage one end of the other plate.

In testimony whereof I affix my signature in presence of two witnesses.

LUKE B. LEADBEATER.

Witnesses:
FORREST STEWART,
CLARK T. BALDWIN.

Copies of this patent may be obtained for five cents each, by addressing the "Commissioner of Patents, Washington, D. C."